United States Patent

Cristol et al.

[15] 3,674,665
[45] July 4, 1972

[54] PHOTOSYNTHESIS OF CYCLOPROPYL COMPOUNDS FROM ALLYLIC COMPOUNDS

[72] Inventors: Stanley J. Cristol; George A. Lee, both of Boulder, Colo.

[73] Assignee: E. I. du Pont de Nemours and Company, Wilmington, Del.

[22] Filed: May 28, 1970

[21] Appl. No.: 41,539

[52] U.S. Cl. ........................................204/163 R, 260/648 F
[51] Int. Cl. ....................B01j 1/10, C07c 17/00, C07c 23/04
[58] Field of Search ..................204/163 R, 163 BH, 163 BE, 204/163 SH; 260/648 R, 648 F

[56] References Cited

UNITED STATES PATENTS

| | | | |
|---|---|---|---|
| 3,507,762 | 4/1970 | Holiday | 204/163 R |
| 3,458,416 | 7/1969 | Hardwick et al. | 204/163 R |
| 3,554,887 | 1/1971 | Feehs | 204/163 R X |

OTHER PUBLICATIONS

Roberts et al., Cyclopropane Derivatives, I. Studies of the Photochemical and Thermal Chlorination of Cyclopropane–Jour. Amer. Chem. Soc., August, 1945, p. 1,281
Chapman, Organic Photochemistry, 1967, Volume I, p. 113–116, 208–220, 312 Volume II, p. 11–16, 34, 69, 81, 171–178
Cram and Hammond, Organic Chemistry, 2nd Edition–1964, p. 328–331, 372, 405–408, 247, 483–485, 493

*Primary Examiner*—Carl D. Quarforth
*Assistant Examiner*—Roger S. Gaither
*Attorney*—James H. Ryan

[57] ABSTRACT

Disclosed is a novel photochemical process for rearranging a variety of allyl compounds to isomeric cyclopropyl compounds, e.g., crotyl chloride to cis- and trans-1-methyl-2-chlorocyclopropane.

16 Claims, No Drawings

PHOTOSYNTHESIS OF CYCLOPROPYL COMPOUNDS FROM ALLYLIC COMPOUNDS

BACKGROUND OF THE INVENTION

1. Field of the Invention

This invention is in the field of photochemical rearrangements, and more particularly provides a novel synthesis of cyclopropyl compounds not otherwise readily available from the corresponding allylic compound.

2. Description of the Prior Art

Compounds which contain the cyclopropyl group have been prepared by pyrolysis of pyrazolines, by reaction of 1,3-dihaloalkanes with divalent metals and by reaction of selected alkyl monohalides, e.g., neopentyl chloride, with alkali metals. Cyclopropanes have also been obtained by reaction of an olefin with diazomethane or with trihalomethane in the presence of an alkali metal alkoxide. These methods of preparation frequently give poor yields of the cyclopropanes and lead to complex mixtures of products from which the cyclopropyl compound is difficult to isolate.

The rearrangement of cyclopropyl derivatives by way of an allyl cation is well-known but the reverse reaction is a contrathermodynamic process, and no such photorearrangements of allyl cations or their precursor allyl halides to form cyclopropyl compounds has been reported.

SUMMARY AND DETAILS OF THE INVENTION

This invention comprises a process for effecting a new reaction for chemically rearranging an allylic compound to a cyclopropyl compound as follows:

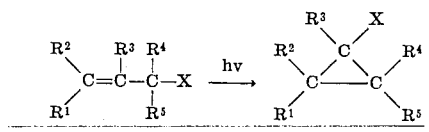

In this equation, any of $R^1$–$R^5$ is hydrogen, hydrocarbyl of up to 10 carbons atoms in which any unsaturation is aromatic, i.e., alkyl, aryl, aralkyl or alkaryl, or fluorine, chlorine or bromine, and X is one of certain good "leaving groups" in nucleophilic substitution reactions. Generally, at least two of $R^1$–$R^5$ are hydrogen. Preferably, allyl compounds ($R^1$–$R^5$ = H–), crotyl compounds ($R^1$ or $R^2$ = $CH_3$, other R's = H—), α-methallyl compounds ($R^4$ or $R^5$ = $CH_3$—, other R's = H), β-methallyl compounds ($R^3$=$CH_3$—, other R's=H) and cinnamyl compounds ($R^1$ or $R^2$=$C_6H_5$— —, other R's=H —) are employed.

The theory of nucleophilic substitutions is well known and discussed at length in such texts as Cram and Hammond's "Organic Chemistry", McGraw-Hill, New York (1959). The present invention does not involve nucleophilic substitutions, but good leaving groups are common to the processes. In nucleophilic substitutions, the leaving group is separated from the organic compounds as an anion. In the present invention, the leaving group migrates from an allylic position to one of the originally unsaturated carbons of the allyl group. Usable groups in this invention include F—, Cl— and Br— with the latter two being preferred.

The process of this invention is carried out by irradiation of a solution of the allyl compound in at least one suitable solvent such as acetone or another lower ketone with light generally in the ultraviolet range, i.e., of a frequency ($\nu$) corresponding to a wavelength of between about 2,500 and 3,600 A. depending on the absorption spectrum of the sensitizer and allylic compound.

Photosensitizers are generally required to absorb light and transfer energy to the reactants. Suitable sensitizers are those that have triplet excitation energies ($E_t$) of at least 72 kg cal/mole and range up to 86 kg cal/mole. These include ketones containing up to 15 carbon atoms as exemplified by acetone, methyl ethyl ketone, 3-pentanone, methyl isobutyl ketone, dibutyl ketone, pinacolone, cyclopentanone, cyclohexanone, dibenzyl ketone; aromatic hydrocarbons having up to eight carbon atoms, e.g., benzene, toluene, ethylbenzene, and the xylenes; and aromatic nitriles containing up to eight carbon atoms as exemplified by benzonitrile, phenylacetonitrile, β-phenylpropionitrile, o-, m-, and p-toluonitrile, and the xylylonitriles. Lower ketones such as acetone, methyl ethyl ketone, pentanone-3, and methyl isobutyl ketone are especially preferred. Other compounds that are effective sensitizers include phenols and benzoic acid.

Certain allyl compounds such as cinnamyl chloride ($E_t$ = 63 kg cal/mole) and other allyl compounds containing aryl or carbonyl groups have triplet excitation energies below 72 kg cal/mole and in these cases it may be useful to employ sensitizers with triplet energies below 72 kg cal/mol. It is also well known that the phenomenon of intersystem crossing occurs in many molecules although its occurrence cannot be predicted today on the basis of structure. In such instances a molecule may absorb direct radiation, be activated to the singlet state and subsequently cross over to the (lower) triplet state spontaneously. Thus, certain allylic compounds of this invention may reach the chemically significant triplet state by intersystem crossing and therefore generate the cyclopropane product without the necessity of an added sensitizer. This invention is intended to include those special cases in which the use of a sensitizer is optional but not necessarily required.

The above-mentioned sensitizers function well as solvents for the reaction. Of the sensitizers, acetone, methyl ethyl ketone, benzene and benzonitrile are preferred, both for economic reasons and for ease of separation from the products. Lower alkanenitriles, i.e., alkanenitriles having 2 to 8 carbon atoms, can also be employed as solvents especially in admixture with about 10–25 percent of a ketone containing up to 15 carbon atoms (sensitizer). Mixtures of ketones and nitriles, e.g., acetone and acetonitrile, are, in fact, somewhat preferred to maximize conversion of the allylic compound to the cyclopropyl product.

Pressures are not critical to the reactions described and the invention can be practiced at pressures ranging from a few millimeters of mercury to about 1.000 lbs./sq. in. For convenience and economy, it is preferred to operate the invention at ambient pressures.

Temperature is similarly not critical and the invention can be practiced at any temperature at which the reaction mixture remains liquid. For example, when acetone is used as the sensitizer-solvent, the irradiation can be carried out at temperatures as low as -100° C. Elevated temperatures are not often used, but the irradiation can be carried out at any temperature below the decomposition point of the cyclopropyl product. As substantially all the energy of the reaction is furnished by the light, most reactions are run at temperatures of -10° to 25°C. for the sake of convenience. However, while operation at higher temperatures is possible, it is preferred to operate at -10° to +15°C. to minimize side reactions.

The concentration of allyl compound in the reaction mixture may vary widely from about 0.005 molar to 1.0 molar. It is generally preferred to operate with solutions from about 0.01 molar to 0.1 molar in order to minimize side reactions and obtain higher yields of the cyclopropyl product.

The photochemical reaction of this invention is sometimes slow depending on the specific allylic compound and sensitizer and may require from 12 to 24 hours to obtain moderate amounts of cyclopropyl compounds. The irradiation reactions are customarily run from 40 hours to 100 hours, or more. When the reaction is completed, the product may be separated by conventional means, if desired, e.g., by distillation, crystallization or chromatography.

The photoreaction is usually run under conditions to realize absorption of the maximum light flux. Suitable reactors can be fabricated to permit immersion of light sources in a well within the reactor. Furthermore, tubular reactors can be inserted inside a helical high pressure mercury lamp. Reactors can also be surrounded by banks of suitable lamps.

EMBODIMENTS OF THE INVENTION

There follow some nonlimiting examples illustrating the process of the invention. Temperatures and pressures in these examples were 15 to 20°C. and 630 mm., respectively. The light used was that delivered by a 450-watt Hanovia High Pressure Quartz Mercury Vapor lamp, Type L, Catalogue No. 679A-36. The primary U.V. emission of this lamp is 3130 and 3,660 A. Percentages, yields and ratios are given in terms of weight unless otherwise indicated.

EXAMPLE 1

A. A 0.3 molar solution of crotyl chloride in acetone was irradiated in a Pyrex flask and under nitrogen atmosphere for 45 hours. The product was analyzed by gas liquid partition chromatography and the relative product ratios found to be 72.3 percent of starting material, 15.3 percent of trans1-methyl-2-chlorocyclopropane, 12.4 percent of cis-1-methyl-2-chlorocyclopropane, along with detectable amounts of 3-chloro1-butene. The methylchlorocyclopropanes were identified spectroscopically.

B. The experiment of A, above, was repeated except for the substitution of pentane (control) for acetone. No cyclopropyl products were obtained.

EXAMPLE 2

Example 1 was repeated except that the reaction time was extended to 56 hours. The following yields were obtained:

| | |
|---|---|
| Starting material | 25.1% |
| Trans-1-methyl-2-chlorocyclopropane | 14.6% |
| Cis-1-methyl-2-chlorocyclopropane | 13.6% |
| 3-Chloro-1-butene | 13.3%. |

EXAMPLE 3

Example 1 was repeated with practical grade crotyl chloride, and the product was separated by preparative scale glpc into the pure cyclopropane compounds, trans-1-methyl-methyl-2-chlorocyclopropane and cis-1-methyl-2-chlorocyclopropane:

$$\underset{H_3C}{\overset{1}{\diagdown}}\overset{2}{\diagup}\overset{Cl}{\diagdown} \quad \underset{}{\overset{Cl}{\diagdown}}\overset{2}{\diagup}\overset{1}{\diagdown}CH_3$$

These were identified by the following spectral data:

NUCLEAR MAGNETIC RESONANCE

| τ | No. H's | Assignment | τ | No. H's | Assignment |
|---|---|---|---|---|---|
| 9.0 (m) | 1 | $C_1$ | 8.8 (c) | 1 | $C_1$ |
| 7.4 (m) | 1 | $C_2$ | 6.96 (m) | 1 | $C_2$ |
| 9.38 (m) | 2 | $C_3$ | 9.64 (d) | 1 | $C_3$-Syn. (J=3.4 Hz) |
| 9.14 (m) | | $C_3$ | 8.98 (m) | 1 | $C_3$-anti. |
| 8.9 (d) (J=1.1 Hz) | 3 | $CH_3$ | 8.8 (s) | 3 | $CH_3$ |

(c = complex; m = multiplet; d = doublet; s = singlet)

Infrared Spectrum:

| | |
|---|---|
| 1029 cm.$^{-1}$ (m) | 1028 cm.$^{-1}$ (w) |
| 1060 cm.$^{-1}$ (w) | |

(m = medium; w = weak)

MASS SPECTROSCOPY

| m/e | Relative strength |
|---|---|
| 90 | 42 |
| 92 | 14 |
| 90 | 17.5 |
| 92 | 6.0 |

EXAMPLE 4

Example 1 was repeated allyl bromide substituted for the crotyl chloride of that example. After 44 hours of irradiation, the reaction mixture contained 4.7 percent of cyclopropyl bromide and 22.8 percent of unchanged allyl bromide.

A control experiment run in the dark showed no formation of cyclopropyl bromide.

EXAMPLE 5

Example 1 was repeated with a solution of allyl chloride in methyl ethyl ketone. After 24 hours of irradiation, 19.3 percent of cyclopropyl chloride was formed.

EXAMPLE 6

When Example 1 was repeated with 3-chloro-1-butene, the product was composed of 20.2 percent of 3-chloro-1-butene, 10.3 percent of trans-1-methyl-2-chlorocyclopropane, 6.3 percent of cis-1-methyl-2-chlorocyclopropane, and 32.7 percent of crotyl chloride.

EXAMPLE 7

Example 1 was repeated except for the substitution of a 4:1 (v/v) mixture of acetonitrile: acetone for acetone. After 43 hours of irradiation, glpc. analysis indicated a mixture containing 43.7 percent of 3-chloro-1-butene, 18.1 percent of trans-1-methyl-2-chlorocyclopropane, 15,8 percent of cis-1-methyl- 2-chlorocyclopropane, and 22.5 percent of 1-chloro-2-butene. Extended reaction times gave essentially quantitative conversion to the cyclopropane derivatives.

EXAMPLE 8

Example 4 was repeated with a 4:1 (v/v) mixture of acetonitrile:acetone substituted for acetone. After 48 hours of irradiation, the reaction mixture contained a 22.2 percent yield of cyclopropylbromide with 19.8 percent recovery of allyl bromide.

EXAMPLE 9

Allyl chloride (ca. 0.3M) was placed in a Pyrex tube with 4:1 (v/v) mixture of acetonitrile:acetone. After 10 hours of irradiation, 94.3 percent cyclopropyl chloride was formed and 5.7 percent of the initial allyl chloride remained.

EXAMPLE 10

3-Chloro-2-methylpropene was irradiated in acetone solution (mol. ratio acetone/propane = 130) yielding 82 percent conversion to the 1-chloro-1-methylcyclopropane.

EXAMPLE 11 cis-1,3-Dichloro-1-propene (ca. 0.3M) was mixed in a Pyrex tube with a 4:1 (v/v) acetonitrile:acetone solution and degassed. After 17 hours' irradiation, 42.8 percent of trans1,2-dichlorocyclopropane and 45.1 percent of cis-1,2-dichlorocyclopropane was formed.

EXAMPLE 12

Example 11 was repeated but with a mixture (22:87) of cis:trans-1,3-dichloro-1-propene. After 17 hours' irradiation, the product was composed of 51.7 percent trans-1,2-dichlorocyclopropane and 40.2 percent cis-1,2-dichlorocyclopropane.

EXAMPLE 13 trans-Cinnamyl chloride (182 mg.) was placed in a thin-wall Pyrex tube with 1.3 g of $CD_3CN$ and 0.18 g. of $CD_3COCD_3$ (sensitizer) and degassed. After 7.2 hours of irradiation, analysis (glpc. and nmr) indicated 8 percent of cinnamyl chloride, 32 percent of α-phenylallyl chloride, 57 percent of trans-2-chloro1-phenylcyclopropane and 3 percent of cis-2-chloro-1-phenylcyclopropane.

EXAMPLE 14

Cinnamyl chloride (100 mg.) was placed in a thin-wall Pyrex tube with 0.5 ml. of acetonitrile and degassed. After 30 hours of irradiation, much loss of material was noted, glpc. analysis indicating that the isomeric product contained 33 percent of cis- and trans-cinnamyl chlorides, 55 percent of trans-2-chloro-1-phenylcyclopropane and 12 percent of cis-2-chloro-1-phenylcyclopropane.

When the compounds in column 1 of the following table are irradiated as described in Example 1, the cyclopropyl compounds of column 2 may be obtained. Both cis- and trans-, and d-l-isomers are obtained in instances where isomerism is possible.

| Allyl compound | Cyclopropane product |
|---|---|
| $C_6H_5CH=CH-CH_2Cl$ | H, Cl, H, H, $C_6H_5$, H (cyclopropane) |
| $CH_3-CH=CCl-CH_2Cl$ | Cl, Cl, H, H, $CH_3$, H (cyclopropane) |
| $ClCH=CHCH_2Cl$ | H, Cl, H, H, Cl, H (cyclopropane) |
| $CH_3CCl=CH-CH_2Cl$ | H, Cl, Cl, H, $CH_3$, H (cyclopropane) |
| p-Tolyl-CH=CH-CH$_2$Br | H, Br, H, H, p-tolyl, H (cyclopropane) |
| α-Naphthyl-CH=CHCH$_2$Cl | H, Cl, H, H, α-naphthyl, H (cyclopropane) |
| $CH_2=\underset{\underset{Cl}{\mid}}{C}-CH_2Cl$ | Cl, Cl (cyclopropane) |

Compounds containing a cyclopropyl group are well known and are useful in many fields. Cyclopropane, the simplest member of this group of compounds and one which can be prepared from all the others, is employed in medical practice as an anesthetic. Other compounds in which one or more cyclopropyl groups are present are employed as components of insecticidal compositions, as additives in liquid fuels, as alkylating agents and as a source of polymeric compositions.

Since obvious modifications and equivalents in the invention will be evident to those skilled in the chemical arts, we propose to be bound solely by the appended claims.

The embodiments of the invention in which an exclusive property or privilege is claimed are defined as follows:

1. The process of producing a cyclopropyl compound of the formula

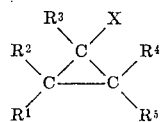

wherein $R^1$, $R^2$, $R^3$, $R^4$ and $R^5$, alike or different, are: hydrogen; hydrocarbyl of up to 10 carbons in which any unsaturation is aromatic; or fluorine, chlorine, or bromine; and, X is a member of the group consisting of fluorine, chlorine and bromine;

which comprises irradiating for at least about 7 hours in liquid phase with electromagnetic radiation of a wavelength between about 2,500 and 3,600 A., and in the presence of at least one photosensitizer having a triplet excitation energy between about 72 and 86 kg cal/mole, an initial compound of the formula

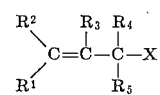

wherein $R^1$–$R^5$ and X are as above.

2. The process of claim 1 in which X is chlorine or bromine.
3. The process of claim 2 including the additional step of separating the resulting cyclopropyl compound.
4. The process of claim 2 employing as a photosensitizer at least one of the group consisting of ketones, aromatic nitriles and aromatic hydrocarbons.
5. The process of claim 4 in which the initial compound is selected from the group consisting of allyl, crotyl, α-methallyl, β-methallyl and cinnamyl compounds.
6. The process of claim 4 in which the initial compound is crotyl chloride.
7. The process of claim 4 in which the initial compound is allyl bromide.
8. The process of claim 4 in which the initial compound is allyl chloride.
9. The process of claim 4 in which the initial compound is 3-chloro-1-butene.
10. The process of claim 4 in which the initial compound is 3-chloro-2-methylpropene.
11. The process of claim 4 in which the initial compound is a 1,3-dichloro-1-propene.
12. The process of claim 4 accomplished in a mixture of a ketone and a lower alkanenitrile.
13. The process of claim 4 accomplished in a mixture of acetonitrile and acetone.
14. The process of claim 13 in which the initial compound is crotyl chloride.
15. The process of claim 13 in which the initial compound is allyl bromide.
16. The process of claim 13 in which the initial compound is a 1,3-dichloro-1-propene.

* * * * *

UNITED STATES PATENT OFFICE
CERTIFICATE OF CORRECTION

Patent No. 3,674,665      Dated July 4, 1972

Inventor(s) Stanley J. Cristol and George A. Lee

It is certified that error appears in the above-identified patent and that said Letters Patent are hereby corrected as shown below:

Col. 1, line 40, "$R^5$" should be of the same type size as "$R^1$";

Col. 3, last 4 lines, the mass spectra data should be separated as shown on page 8, last 4 lines, of the application to indicate the proper correlation of data and isomers, formulas of which head columns in lines 42-45;

Col. 4, line 4, -- with -- should be inserted after "repeated"; and

Col. 4, line 51, "propane" should be -- propene --.

Signed and sealed this 8th day of May 1973.

(SEAL)
Attest:

EDWARD M. FLETCHER, JR.
Attesting Officer

ROBERT GOTTSCHALK
Commissioner of Patents